(12) United States Patent
Barford

(10) Patent No.: US 7,493,686 B2
(45) Date of Patent: Feb. 24, 2009

(54) GUTTER WELDING DEVICE

(75) Inventor: John Barford, Oakville (CA)

(73) Assignee: GSW Building Products Inc, Barrie, ON (CA)

(*) Notice: Subject to any disclaimer, the term of this patent is extended or adjusted under 35 U.S.C. 154(b) by 555 days.

(21) Appl. No.: 11/019,212

(22) Filed: Dec. 23, 2004

(65) Prior Publication Data

US 2005/0226686 A1    Oct. 13, 2005

(30) Foreign Application Priority Data

Mar. 31, 2004    (CA)    .................... 2464177

(51) Int. Cl.
*B23P 23/00* (2006.01)

(52) U.S. Cl. .................. 29/560; 29/564.7; 83/471.1; 83/490; 156/304.2; 156/304.6; 156/359; 156/362; 156/502; 156/510

(58) Field of Classification Search .......... 29/560, 29/564, 564.1, 564.7, 65, 33 B, 33 K; 83/490, 83/425.2, 425.3, 425.4, 508.3, 471.1, 471.3; 156/304.2, 304.5, 304.6, 499, 510, 535, 502, 156/359, 362, 353, 358
See application file for complete search history.

(56) References Cited

U.S. PATENT DOCUMENTS

| | | | | |
|---|---|---|---|---|
| 1,457,600 | A * | 6/1923 | Parker | 83/490 |
| 3,543,815 | A * | 12/1970 | Menge | 83/391 |
| 3,665,982 | A * | 5/1972 | Kvalheim | 83/471.1 |
| 4,752,350 | A * | 6/1988 | Schuster | 156/379.6 |
| 4,909,892 | A * | 3/1990 | Quinn et al. | 156/499 |
| 5,902,447 | A * | 5/1999 | Johnson et al. | 156/499 |
| 6,273,988 | B1 * | 8/2001 | Zollinger et al. | 156/304.2 |
| 6,615,698 | B2 * | 9/2003 | Chuang et al. | 83/24 |
| 6,875,305 | B2 * | 4/2005 | Tesch | 156/304.6 |
| 7,328,734 | B2 * | 2/2008 | Bacik et al. | 156/358 |
| 2005/0121132 | A1 | 6/2005 | Bacik et al. | |

* cited by examiner

Primary Examiner—Erica E Cadugan

(57) ABSTRACT

A method of thermally joining plastic eavestrough allows plastic eavestrough systems to be considered in more applications including traditional aluminum eavestrough systems where long lengths of continuous eavestroughs are desired. The method allows end to end joining of plastic eavestrough with a thermal joint therebetween or an angled connection with a thermal joint therebetween. This allows plastic eavestrough systems to be customized on site for improved performance and appearance. Thermally joined plastic eavestrough sections either aligned in an end to end or angled connection are possible.

15 Claims, 15 Drawing Sheets

Front View

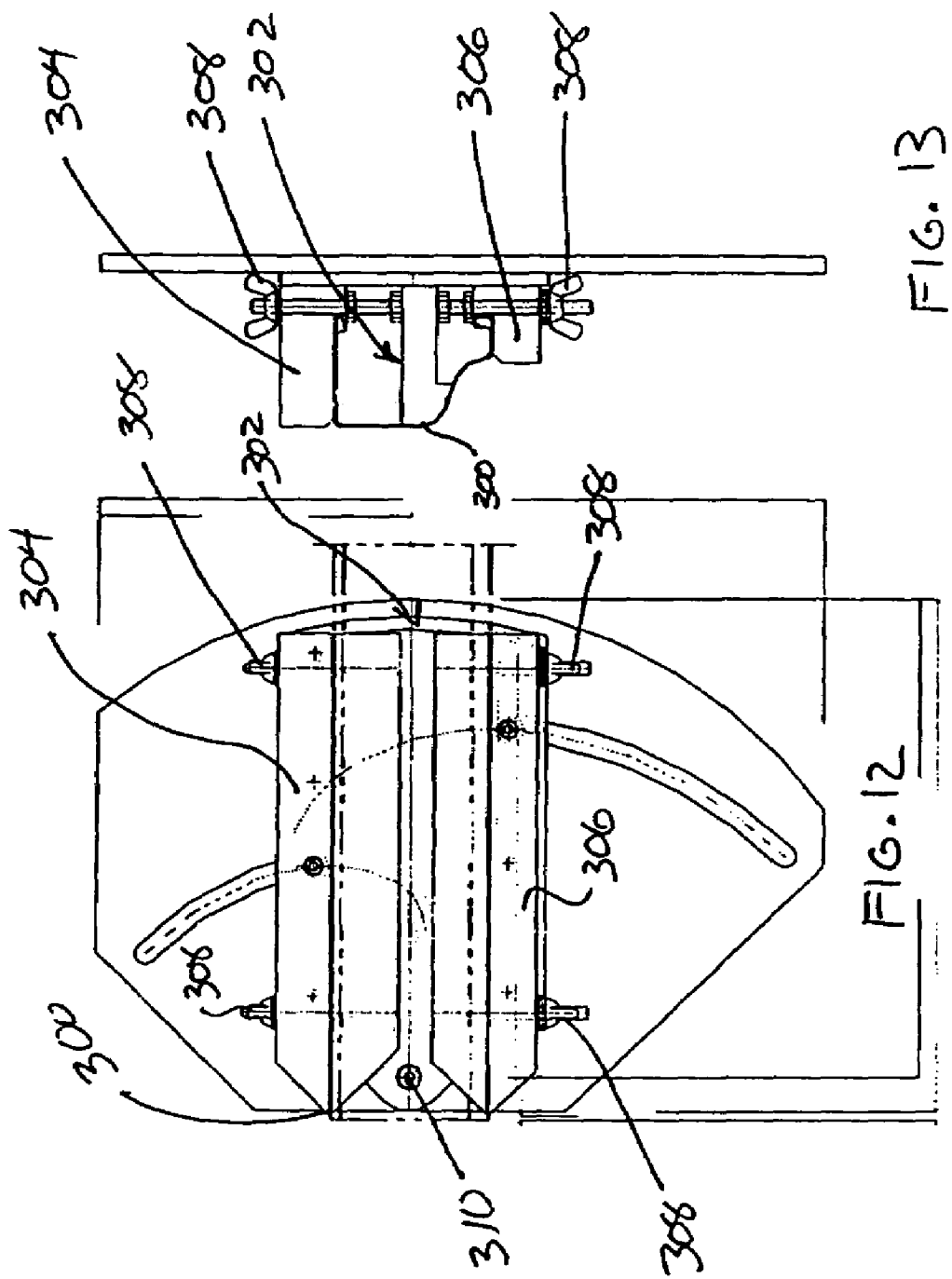

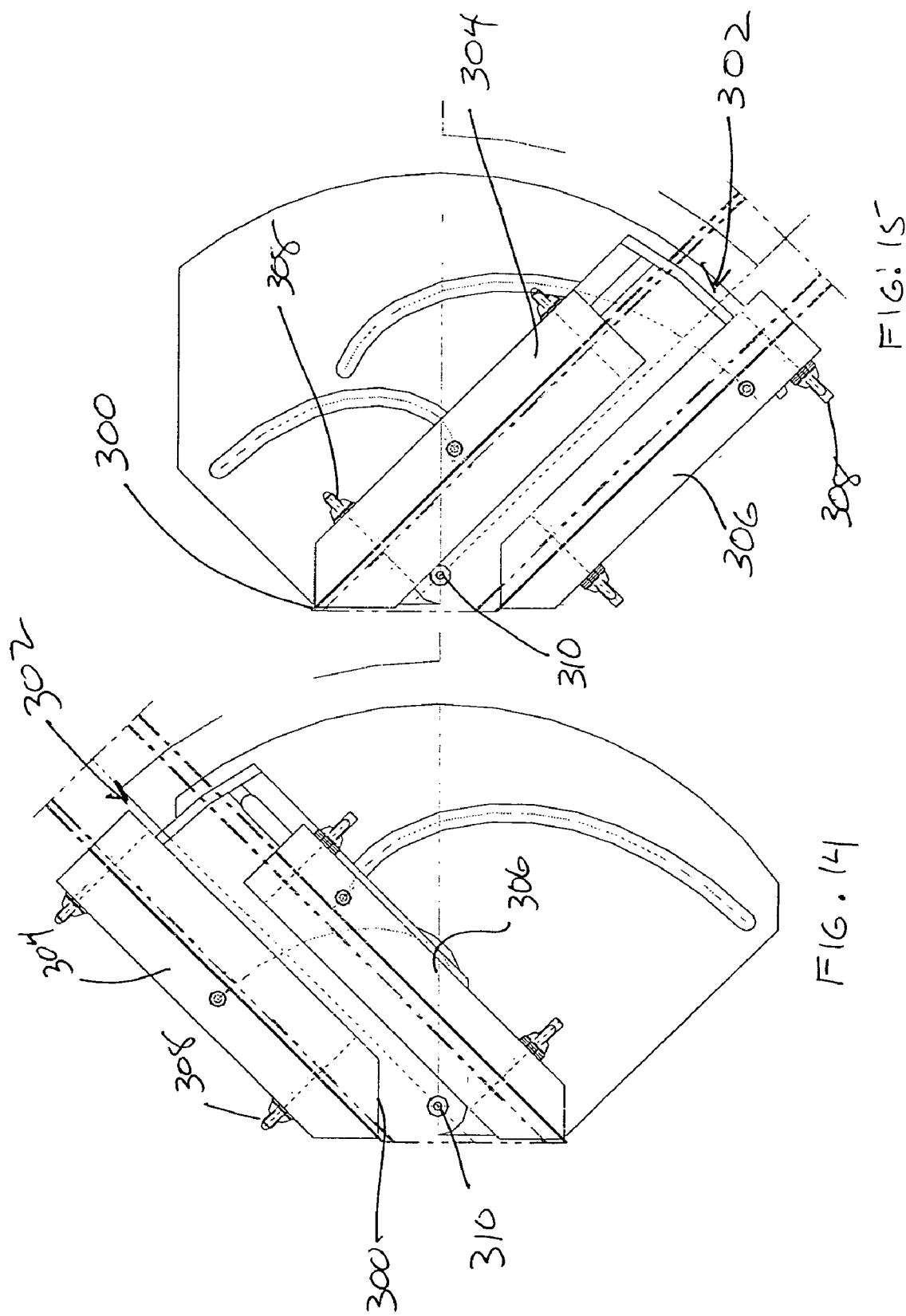

GUTTER WELDING DEVICE

FIELD OF THE INVENTION

The present invention relates to joining of extruded plastic components and in particular, relates to a method and apparatus of cutting and fusing elongate plastic components one to the other.

BACKGROUND OF THE INVENTION

Roll formed aluminum seamless eavestrough systems are well known and commonly used for commercial and domestic building applications. The seamless aluminum eavestrough can be produced in any desired length to fit a particular application. This continuous length of eavestrough will not leak intermediate its length and any leaks in the system are at corner connectors and downspout connectors.

Extruded plastic eavestrough can also be manufactured in long lengths, however, for shipping to retail outlets, storage at retail outlets as well as transport by the end consumer, the eavestroughs are normally sold in short lengths of ten to twelve feet. For many applications, a joiner connector will be required to join two lengths of eavestroughs for longer runs. Any eavestrough connector has the potential to leak and also produces a visual interruption in the length of the eavstrough. One solution for plastic eavestroughs is to merely sell longer lengths and thereby reduce the number of connectors, however, this solution is often not practical. Attempts have been made to thermally form on a job site a flat plastic strip material into a continuous length of plastic eavestrough much in the manner of roll formed aluminum eavestrough. These attempts have not been successful.

Plastic eavestrough has excellent durability, resiliency, and high quality surface finish and would be an alternative to aluminum eavestrough if longer continuous lengths were available. For new construction, vinyl or plastic siding is often used and these installers could easily install plastic eavestrough if the joiner problem could be resolved. In some circumstances, plastic eavestrough would be preferred.

The present invention provides an apparatus as well as a method for thermally joining or welding two lengths of eavestrough to form a continuous length without a separate connector. The opposed ends of the eavestrough are heated to soften the plastic material and the heated ends are brought together under pressure to join the two sections. The softened plastic at the ends of the respective eavestrough sections adhere or co-mingle resulting in a strong connection. This method can be used to join eavestroughs in a straight end to end manner to form a continuous length of eavestrough or the method can be used to join eavestrough sections at a particular desired angle. This provides a further advantage of the invention in that plastic eavestroughs can be thermally joined at different angles one to the other thereby further reducing the probability of leakage at a corner.

The present invention is also directed to an apparatus which is easily used on a construction site to thermal join or weld eavestrough sections.

SUMMARY OF THE INVENTION

An apparatus for cutting and joining plastic eavestrough in a thermal type connection comprises a power saw movable between a storage position and an eavestrough cutting position, two opposed eavestrough supports either side of the eavestrough cutting position, a thermal plate movable between a storage position and an eavestrough heating position adjacent said eavestrough cutting position, a support arrangement for the eavestrough supports allowing said eavestrough supports to move relative to another in a lateral direction with respect to the predetermined cutting position.

In an aspect of the invention, the support arrangement for the opposed eavestrough supports are two laterally movable tables with each table having a removable eavestrough support block mounted thereon.

In a further aspect of the invention, the eavestrough support blocks are shaped to receive an eavestrough section in an inverted orientation.

In yet a further aspect of the invention, the thermal plate in the eavestrough heating position and the saw in said cutting position are each aligned or parallel with a common working plane between the eavestrough supports.

In yet a further aspect of the invention, the two tables are supported on slide rails for movement towards and away from the cutting position.

In a different aspect of the invention, the power saw is mounted for sliding movement in a direction perpendicular to the lateral direction of the two tables.

In a further aspect of the invention, the apparatus includes a clamp arrangement for each of the eavestrough support blocks.

In an aspect of the invention, the tables have an eavestrough cut stop position and an eavestrough thermal joining stop position for controlling the lateral movement of the tables.

In a different aspect of the invention, the apparatus includes a power control module for controlling a power supply between the power saw and the thermal plate. The power control module interrupts power to the thermal plate when the power saw is activated. Preferably the apparatus operates on a 120 volt power supply.

In a further aspect of the invention, the eavestrough support blocks are pivotally mounted on said tables for movement to angled positions used for forming different angled corner connections of the eavestroughs.

In a further aspect of the invention, each table includes an angled gauge for setting a desired corner angled configuration.

In a further aspect of the invention, the tables are adjustable to vary a contact pressure between the eavestroughs during joining thereof.

In yet a further aspect of the invention, the tables include a manual pivoting lever for controlling the position thereof.

BRIEF DESCRIPTION OF THE DRAWINGS

Preferred embodiments of the invention are shown in the drawings, wherein:

FIG. 13 is an end view of FIG. 12;

FIG. 14 is a top view of the sliding section eavestrough support in an end position for angled cutting and joining; and FIG. 15 is a top view similar to FIG. 13 in a reverse end position.

DETAILED DESCRIPTION OF THE PREFERRED EMBODIMENTS

Figure 1:
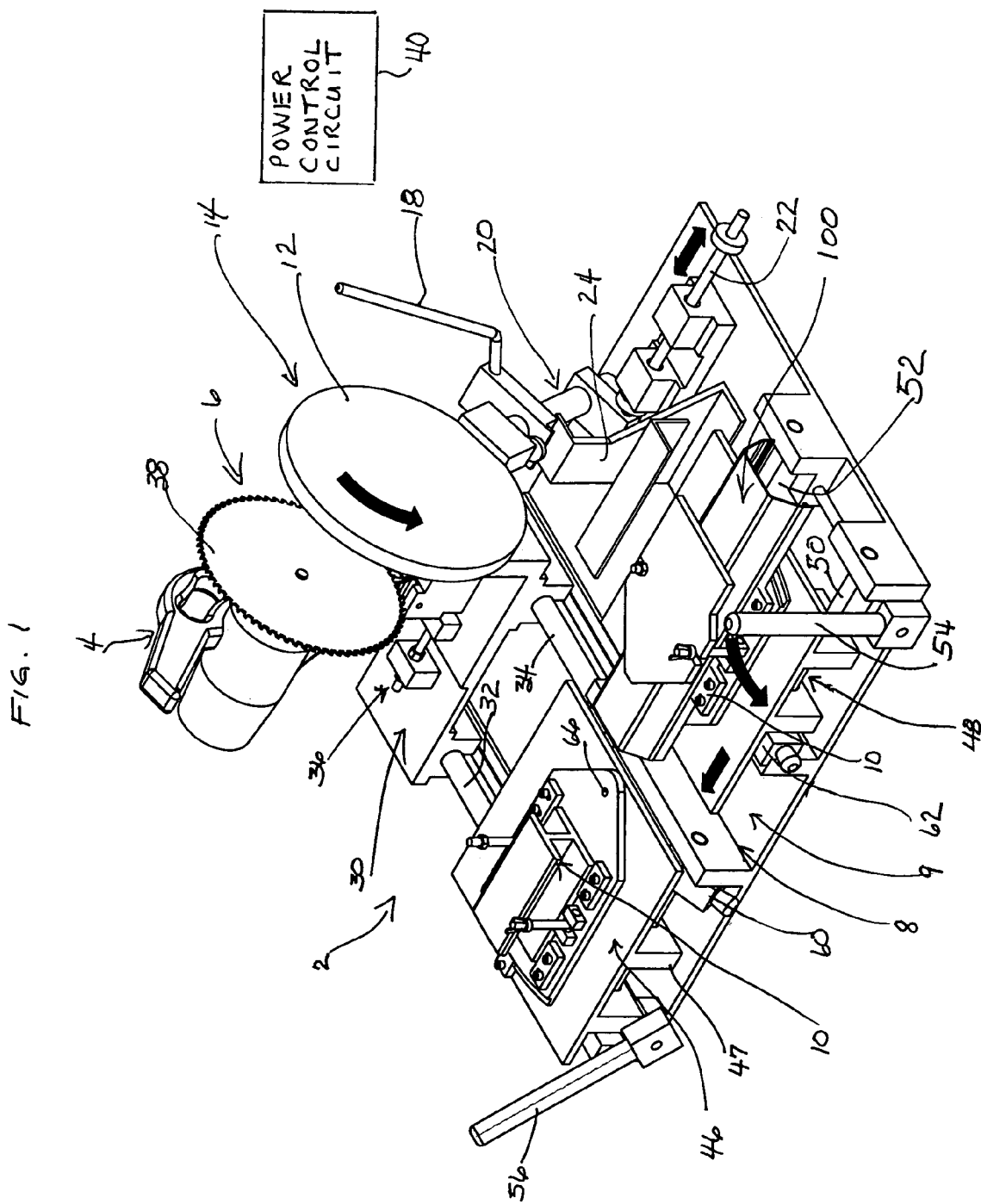
FIG. 1 is a front perspective view of the apparatus for cutting and joining plastic eavestrough.
Figure 2:
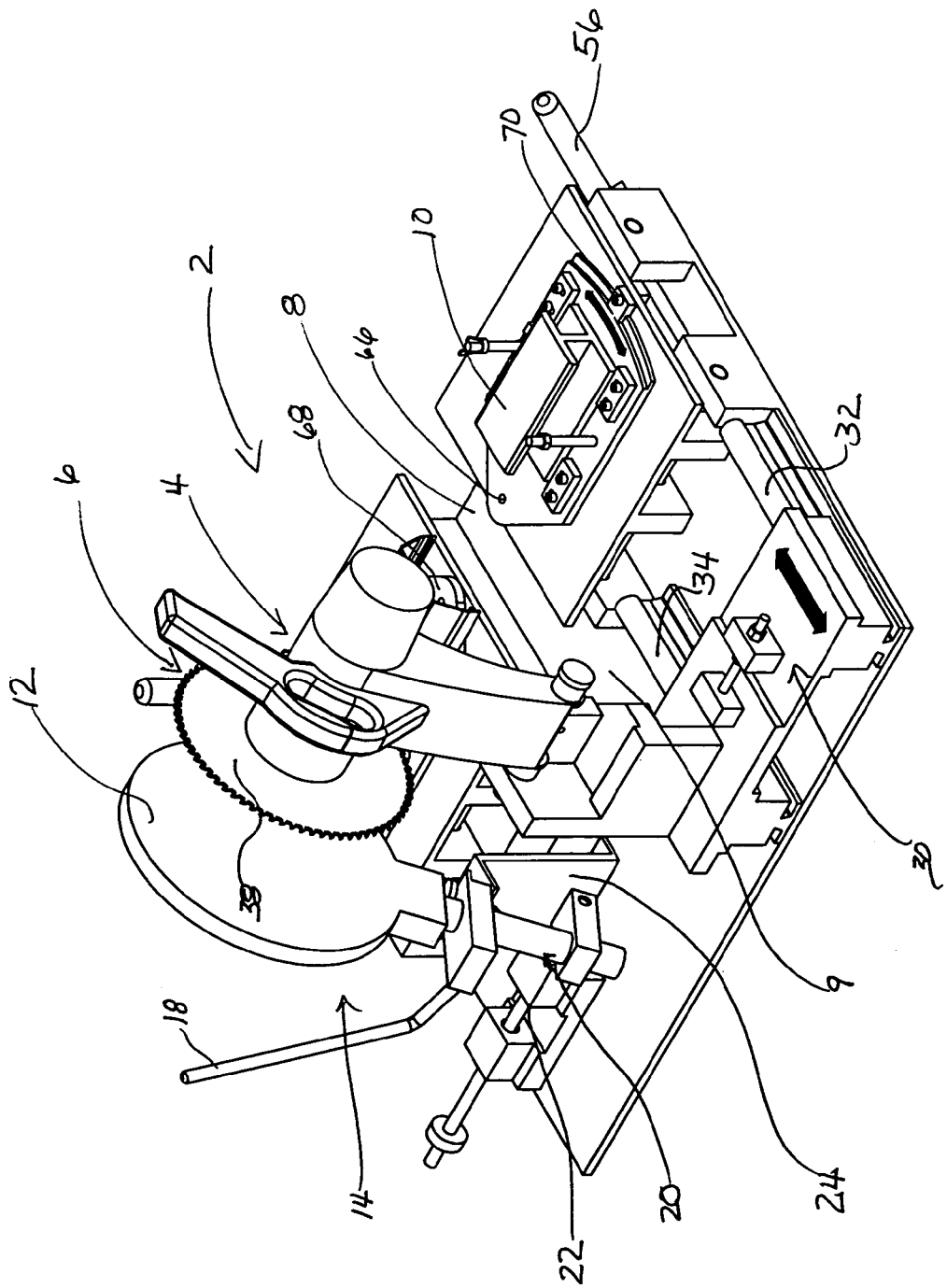
FIG. 2 is a rear perspective view of the apparatus.
Figure 3:
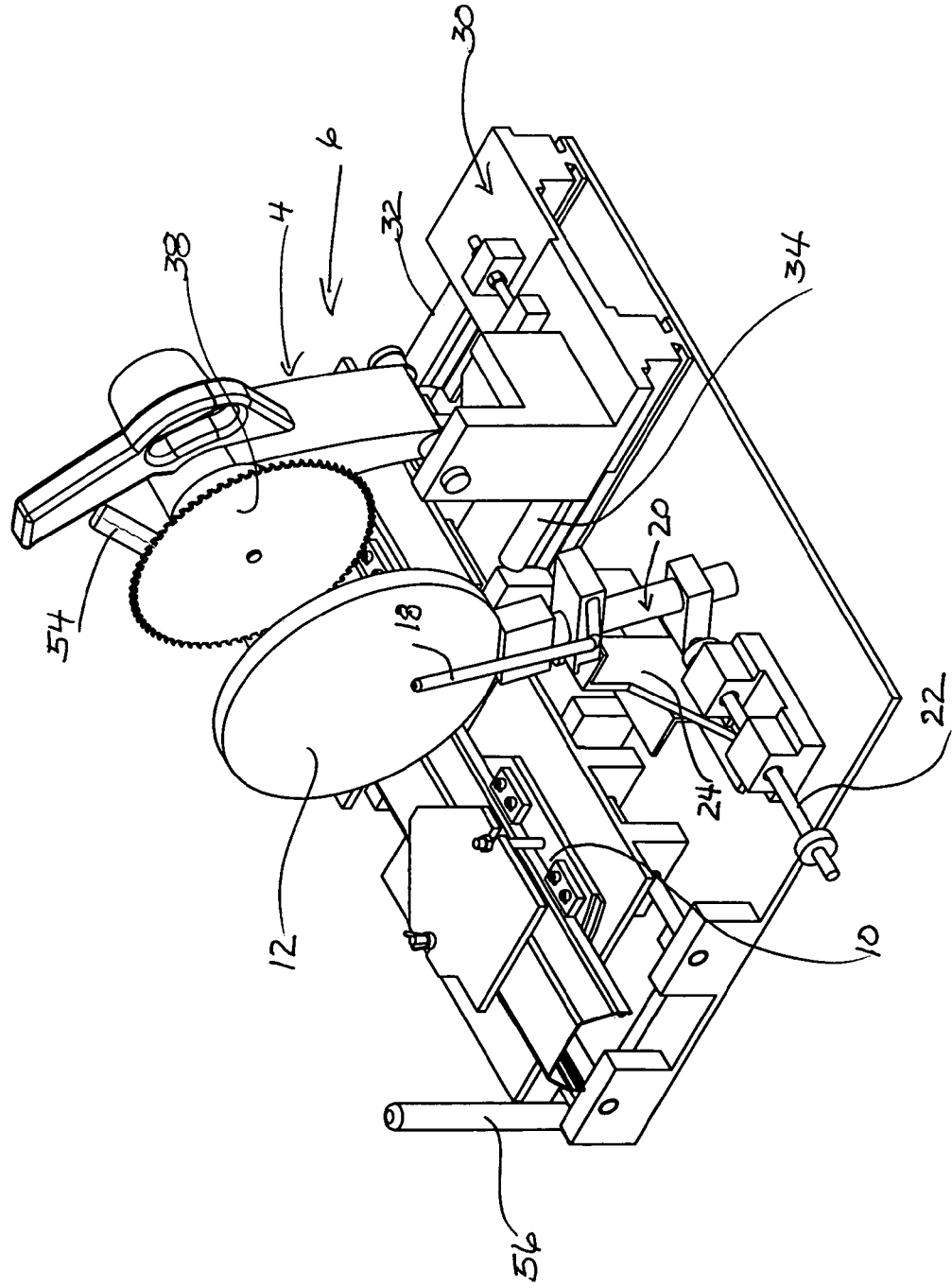
FIG. 3 is a back perspective view of the apparatus.
Figure 4:
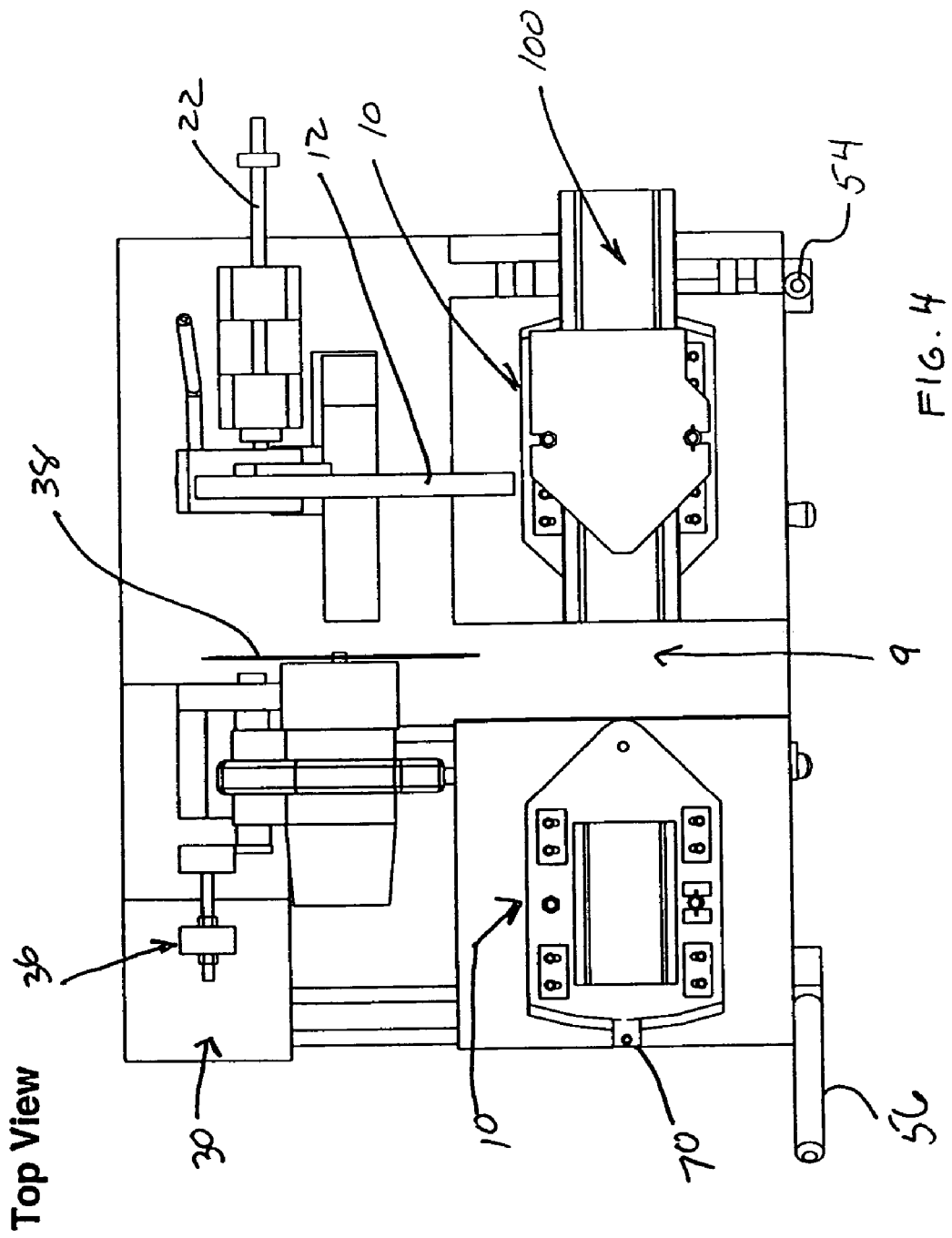
FIG. 4 is a top view of the apparatus.
Figure 5:
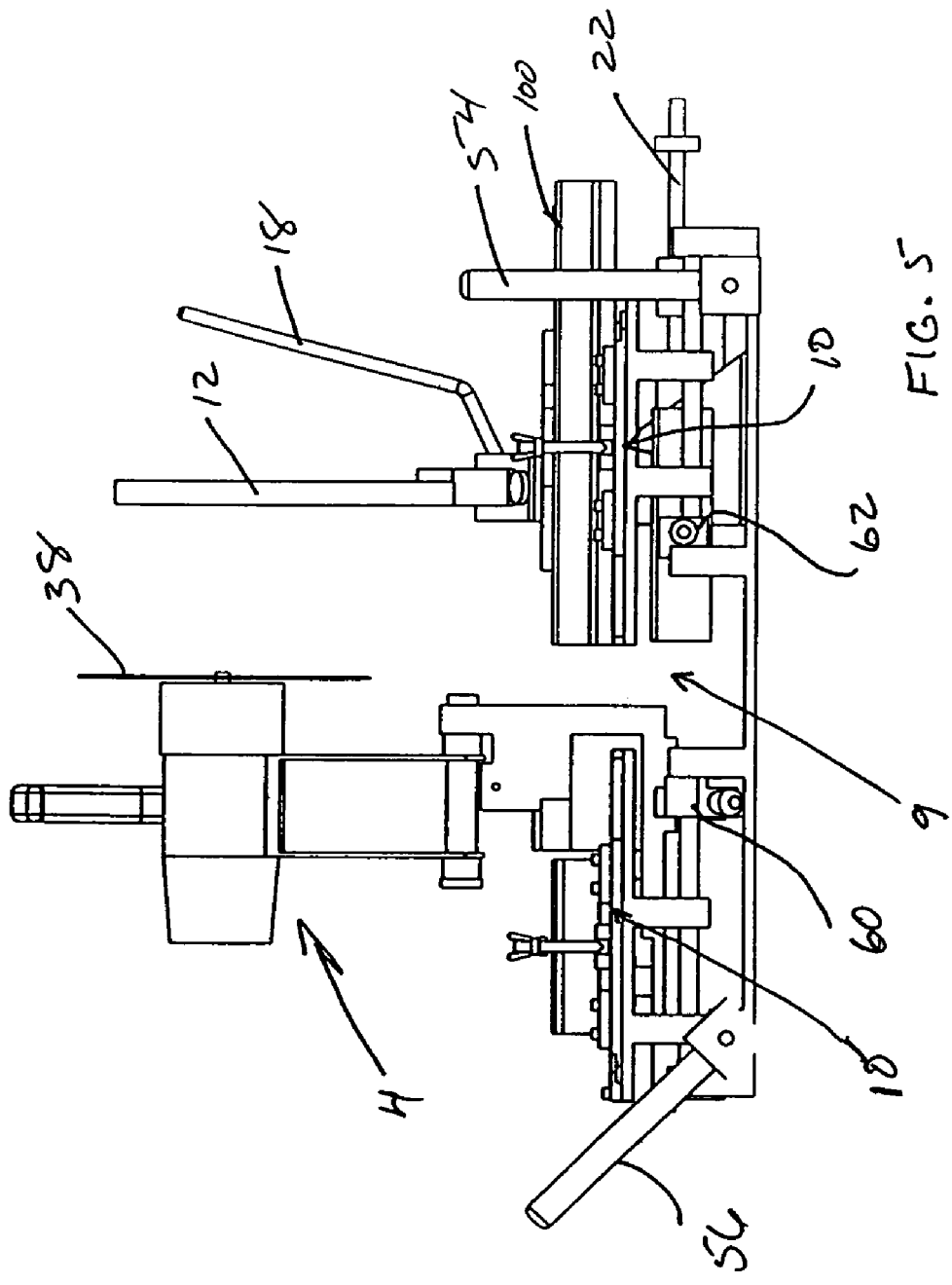
FIG. 5 is a front view of the apparatus.

The cutting and joining apparatus 2 shown in the Figures includes a power saw 4 movable from the storage position 6 to an in use eavestrough cutting position 8 generally centered between the opposed eavestrough supports 10. A thermal plate 12 for heating of the ends of the eavestrough, is movable from the storage position 14 as shown in FIG. 1, to a thermal heating position in the cutting and welding gap 9, adjacent the cutting eavestrough position and the thermal plate heating position shown in the front view of FIG. 8.

The thermal plate 12 in the thermal plate storage position 14, is held in this position by the support stand 24. The thermal plate 12 is connected to the support arm 20 controlled by the thermal plate handle 18. This assembly is pivotally attached to and laterally movable along the slide rod 22. The thermal plate is moved by pushing on the handle 18 to remove the support arm from the support stand, sliding the thermal plate to the left and then lowering the thermal plate downwardly into the cutting and welding gap 9. The thermal plate is allowed to float in the cutting and welding gap 9 and in the heating position of the plate, one length of eavstrough is heated by one side of the plate and the opposed section of eavestrough is heated on the opposite side of the plate. Some pressure is applied to the plastic eavestrough sections during the heating operation to provide effective heat transfer. Once the eavestrough sections have been appropriately softened by heating on the thermal plate 12, they are pushed together in a controlled and aligned manner to fuse or weld the two heated ends and result in a thermal joint or plastic weld of the two eavestrough sections.

Figure 10:
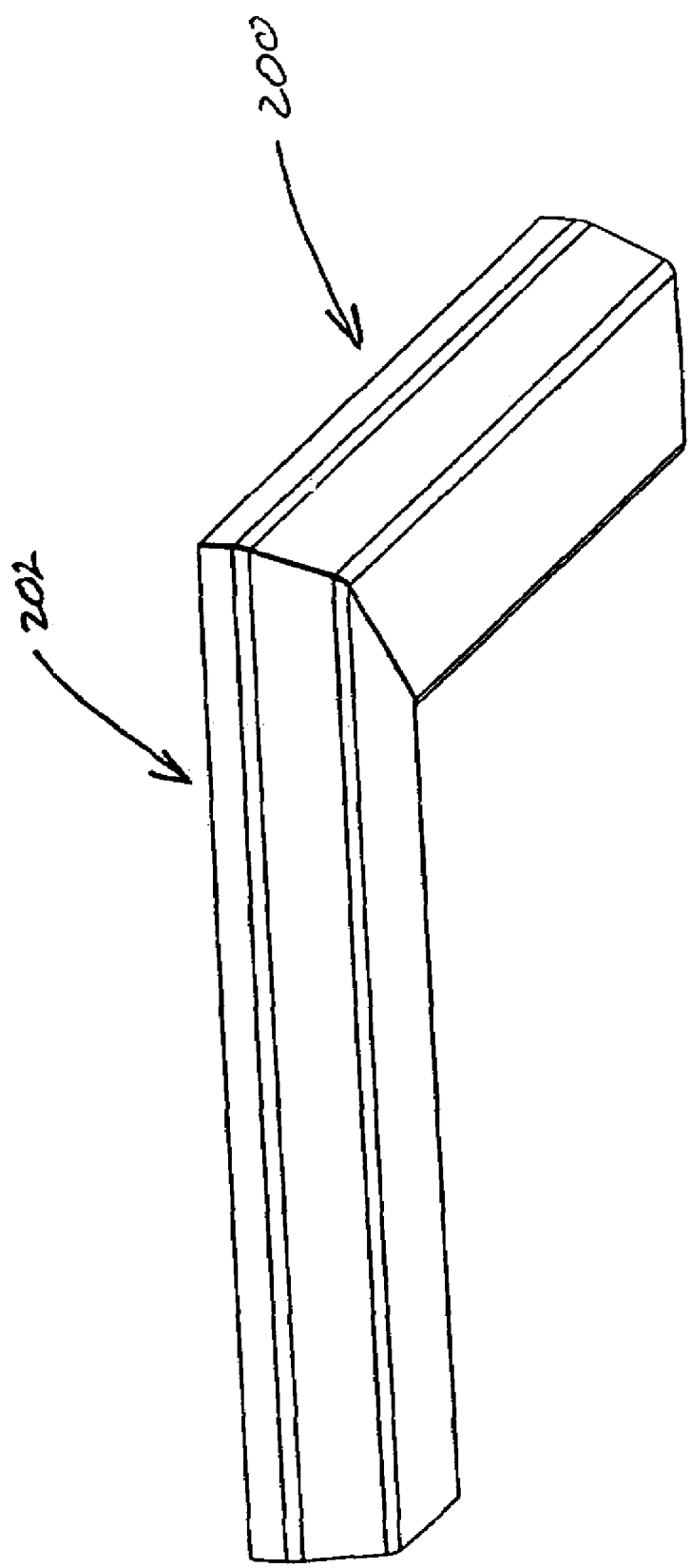
FIG. 10 is a perspective view of the outer shape of two eavestrough sections joined in a corner configuration.
Figure 11:
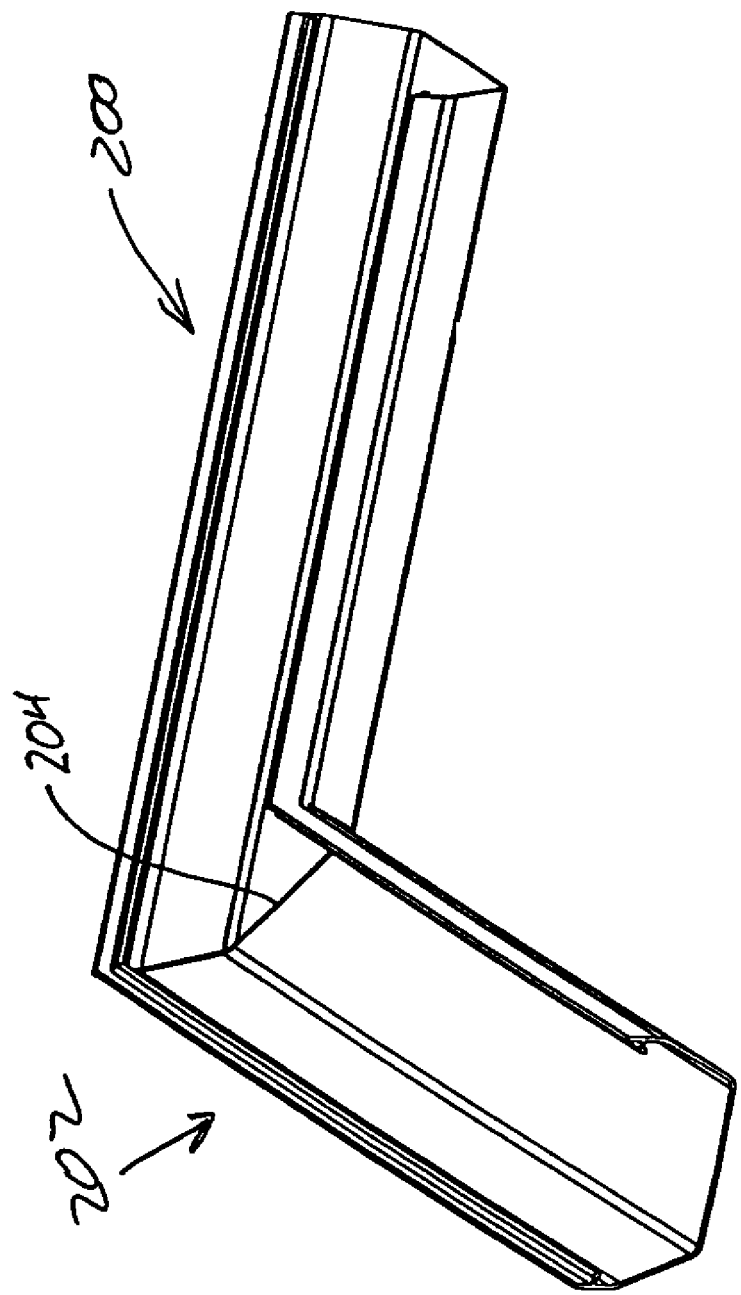
FIG. 11 is a top perspective view of the joined eavestrough sections.

It has been found that this connection of the eavestrough sections is of high structural integrity and this is perhaps at least partially due to some thickening of the eavestrough material in the weld as will be further explained with respect to the joined plastic eavestrough section of FIGS. 10 and 11.

The saw 6 is mounted on a sliding saw table 30 having slide rails 32 and 34. The saw is spring biased to the upright storage position as shown in FIG. 1 and is pivotally movable downwardly to a lower cutting position, in the manner of a chop saw. The sliding saw table 30 improves the cutting characteristics of the saw and also allows the saw table and then pivotally mounted saw to move rearwardly to provide additional space for joining two eavestrough sections at an angle. The sliding movement of the saw table rearwardly also assists in simplifying the positioning of the thermal plate in the cutting and welding gap 9.

The cutting and joining apparatus 2 preferably operates on a known cutting position of the saw. The lateral position of the saw blade can be controlled by means of the lateral saw adjustment mechanism 36. This allows the operator to precisely locate the saw blade in the cutting and welding gap 9. The saw blade provides a perpendicular cut to the eavestrough sections. It is preferred that the power saw 6 includes a relatively large diameter saw blade 38 to improve the cutting characteristics and allow simple cutting of the eavestrough sections at different angles. A twelve inch carbide blade works satisfactorily, however, a fourteen inch carbide blade is preferred. Smaller blades can be used, however, the cut is somewhat more ragged. Larger, finer blades generally improve the cutting of plastic. Similarly, the thermal plate 12 is oversized relative to the square face of the eavestrough sections as these eavestrough sections will be cut at different angles to form different angled joints of two abutting eavestrough sections. It is preferred that the thermal plate 12 is of a size of at least eight inches and preferably twelve inches. A circular thermal plate 12 has been shown, however other shapes are possible. This is a common readily available thermal plate used in straight line joining of plastic pipe.

An eavestrough section 100 is shown in FIG. 1 in the apparatus secured in an inverted orientation. It is found that cutting of eavestrough sections is simplified by appropriately supporting of the eavestrough section in an inverted orientation. Proper support is provided by the opposed eavestrough supports 10 pivotally supported on the left and right sliding tables 46 and 48. The right sliding table has slide rods 50 and 52 and the left sliding table has similar slide rods. Each of these sliding tables are basically free floating, however, they can be pushed towards the center of the apparatus using handle 56 controlling the left sliding table and handle 54 controlling the right sliding table. Each of the eavestrough supports 10 are releasably supported on these sliding tables and have a pivot axis 66 for the left table and a pivot axis 68 for the right table. In this way the eavestrough supports 10 can be pivoted about these axis and locked by means of the left lock 70 and the right lock 72 to allow cutting of the respective eavestrough section at a desired angle.

Various markings can be provided on the sliding tables to indicate a desired angle of cut. Each of the tables is orientated at the same angle to allow aligned abutting of the eavestrough sections during joining. This orientation is assured as the eavestrough sections are first cut by the power saw 6 in the desired orientation and the eavestrough sections are maintained in this orientation on the respective sliding table. The sliding table allows the one eavestrough section to be withdrawn from the cutting position to allow cutting of the other eavestrough section while maintaining the orientation thereof, subsequently the thermal plate is brought into the cutting and welding gap 9 for heating the cut ends of the eavestroughs.

In the preferred embodiment, the left eavestrough section is brought into contact with the thermal plate by means of the lever 56. The left table is controlled by the stop block 60 which is shown in the cutting position. This is a two shoulder stop block defining two end positions for the sliding table 46. Stop block 60 of FIG. 1 is shown in the cutting position whereas the stop block 62 of the right sliding table 48 is in a thermal welding position. The double shoulders of these stop blocks take into account the thickness of the saw blade as well as allowing a pressure to be applied between the two eavestrough sections used for joining.

As previously mentioned, there is a regional thickening of the eavestrough at the thermal join due to a partial bulging or thickening at the join line of the eavestroughs. This regional thickening is believed to improve the structural integrity of the weld. In any event, some pressure is applied during the welding and the sliding tables allow for control of the pressure manually or otherwise. The pressure can be controlled by the operator by means of one of the handles assuming the other table is locked. It is also possible to use an adjustable spring arrangement or other means for controlling the abutting pressure.

As can be appreciated, there are different cross sectional shapes of plastic eavestroughs. A contemporary style cross section is shown in FIG. 1 whereas the more common eavestrough shape is the traditional "K" style eavestrough section used in plastic and aluminum eavestrough. The opposed eavestrough supports 10 are easily removed from the right and left sliding tables and the appropriate support blocks can be then mounted on the tables for the desired eavestrough section.

The apparatus as shown in FIG. 1, also includes a clamping mechanism generally shown as 76 and 78 for fixing of the eavestrough sections on the opposed eavestrough supports 10. It is desirable to properly support and secure the eavestrough sections during the cutting and joining process. The clamping mechanism also maintains the eavestrough's aligned position after cutting and in preparation for the thermal heating and joining steps.

Figure 6:
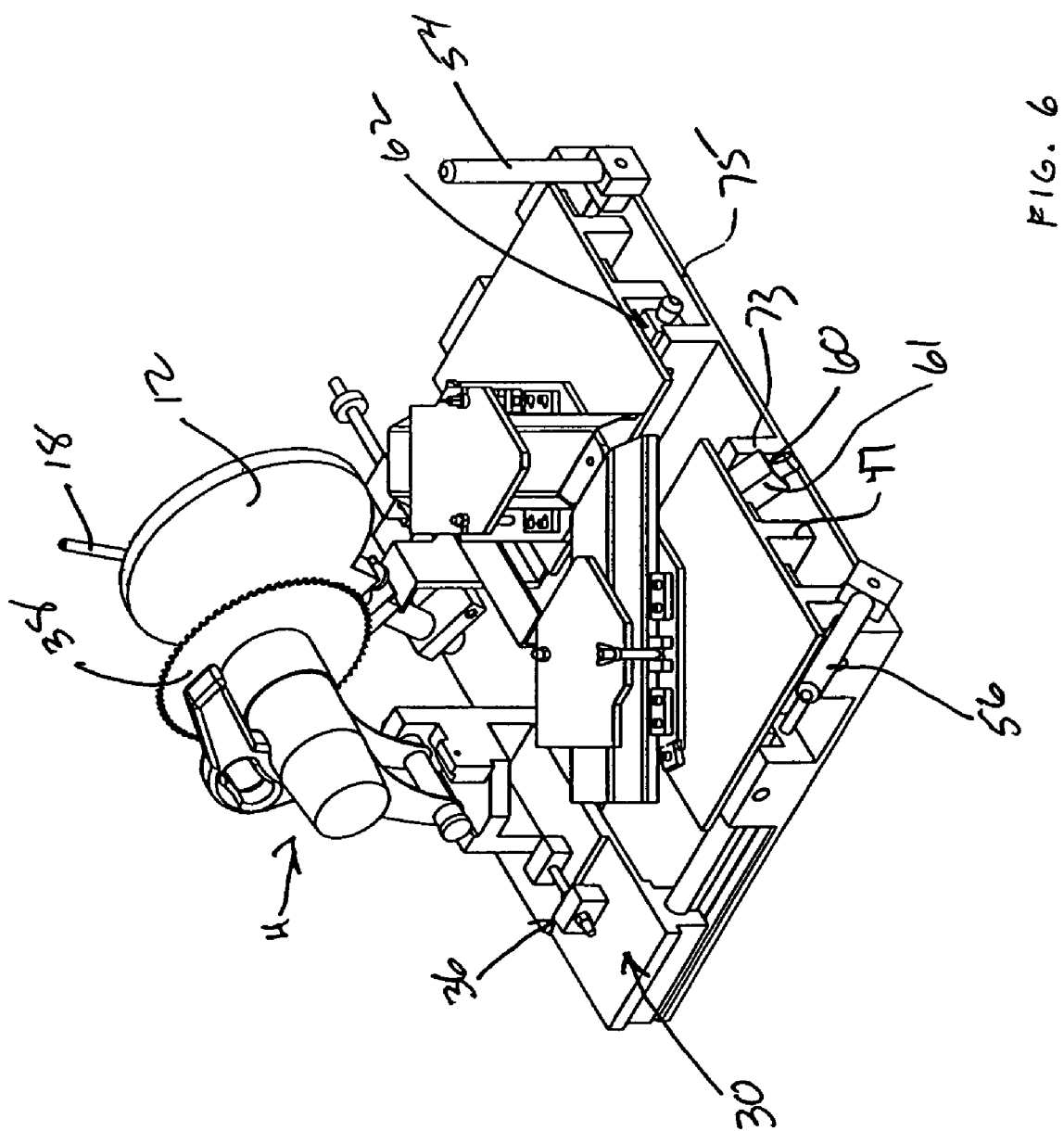
FIG. 6 is a front perspective view of the apparatus and the joining of two lengths of eavestrough in an angled corner configuration.
Figure 7:
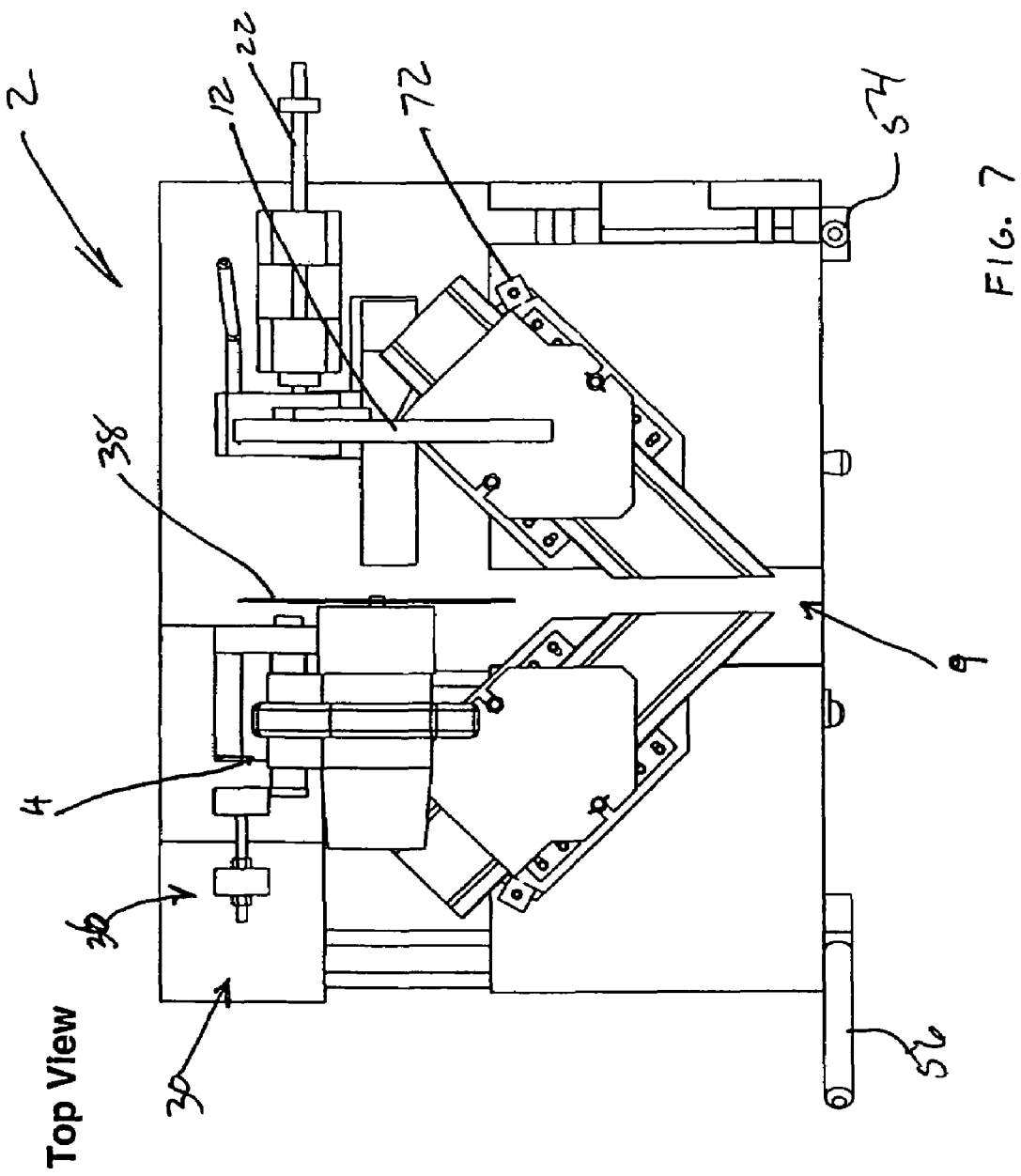
FIG. 7 is a top view of the apparatus of FIG. 6.

FIG. 6 shows two small eavestrough sections which have been cut at a 45 degree angle and are about to be joined in a corner weld configuration. The eavestrough sections in practice would be of substantially greater length, for example, ten or twenty foot sections. The two eavestrough sections are mounted on their eavestrough supports 10 and clamped by the appropriate clamping mechanism 76 or 78. In preparation for cutting, the double shoulder stop blocks 60 and 62 are moved to the position of stop block 60 shown in FIG. 1 or FIG. 6.

Sliding table 46 would have been moved by the lever 56 such that the downwardly extending flange 47 was brought into contact with the face 61 of the stop block 60. The stop block 60 is also in contact with the fixed flange 73 extending upwardly from the base plate 75. The saw is then moved from the storage position to the cutting position to cut the 45 degree angle cut. The securement of the eavestrough section on the support blocks and the indexed table controls the position of the cut end of the eavestrough relative to the table 46. Once each of the eavestrough sections have been cut at the 45 degree angle, the stop block 60 and 62 are moved to the thermal weld stop positions of the block 62 in FIG. 6. The stop blocks 60 and 62 do not move with the table but merely act as an adjustable stop face.

Figure 8:
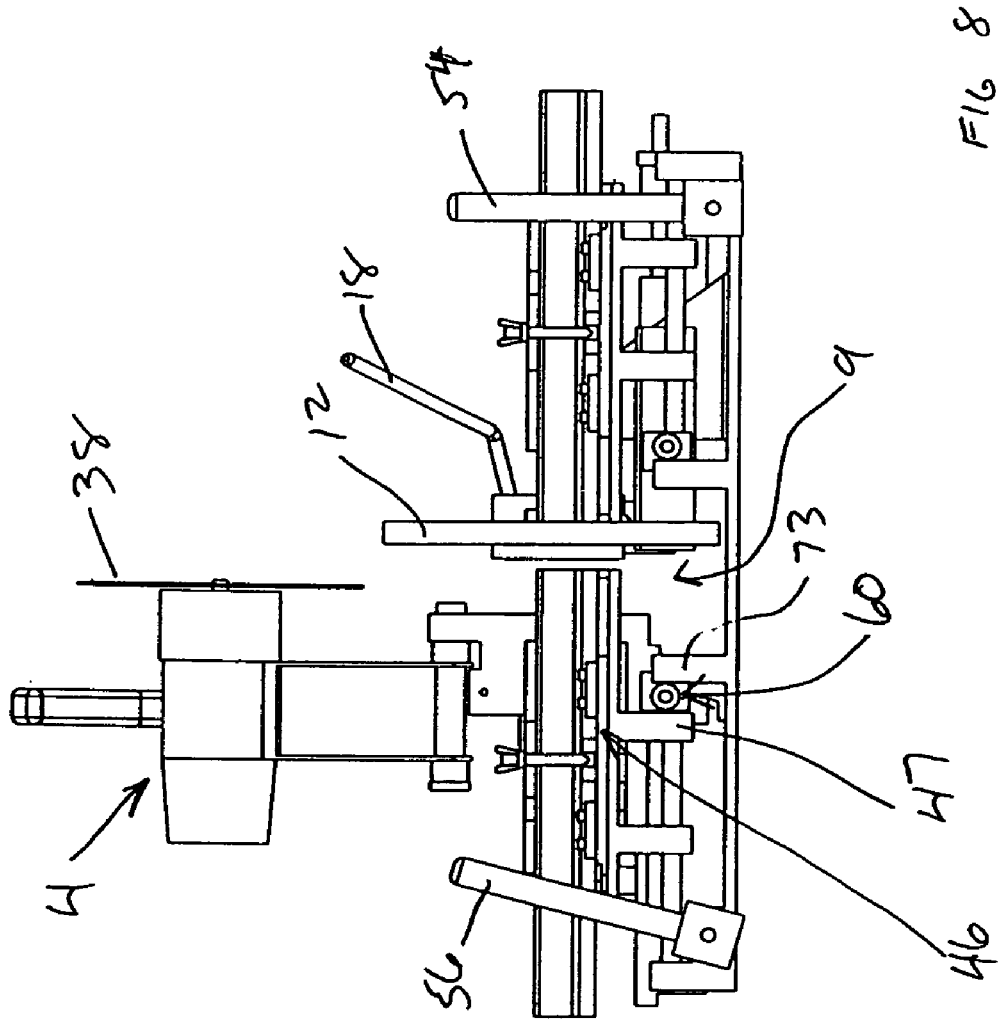
FIG. 8 is a front view of the apparatus of FIG. 6.

The thermal plate 12 can then be moved from its storage position of FIG. 6 to be positioned between the eavestrough sections at shown in FIG. 8. In this case, the right eavestrough section has also been brought into engagement with the thermal plate 12. The left eavestrough section and the handle 56 were previously adjusted to cause the sliding table to bring flange 47 into contact with the stop block 60 in the thermal weld position. Basically, the upright flange 73 of the base is in engagement with the stop block 60 which is then capable of stopping the flange 47 of the sliding table 46. The handle 56 not only moves the table to this position but it also acts as a lock. An over center linkage arrangement provides the desired movement (see FIG. 12).

The thermal plate 12 is then brought into the gap 9 and is free to float laterally in this section. With the left table 46 in a fixed or locked position, as shown in FIG. 8, the right table and the position of thermal plate 12 can be controlled by means of the handle 54. This is used to push the thermal plate 12 to the left and into contact with the end of the eavestrough section on the left table 46. A desired pressure between the two eavestrough sections can be maintained by manual control in the handle 54 or by a spring or other pressure control mechanism. During the heating process, the eavestrough supports 10 support the ends of the eavestrough and also provide support for the ends during the welding process.

Figure 9:
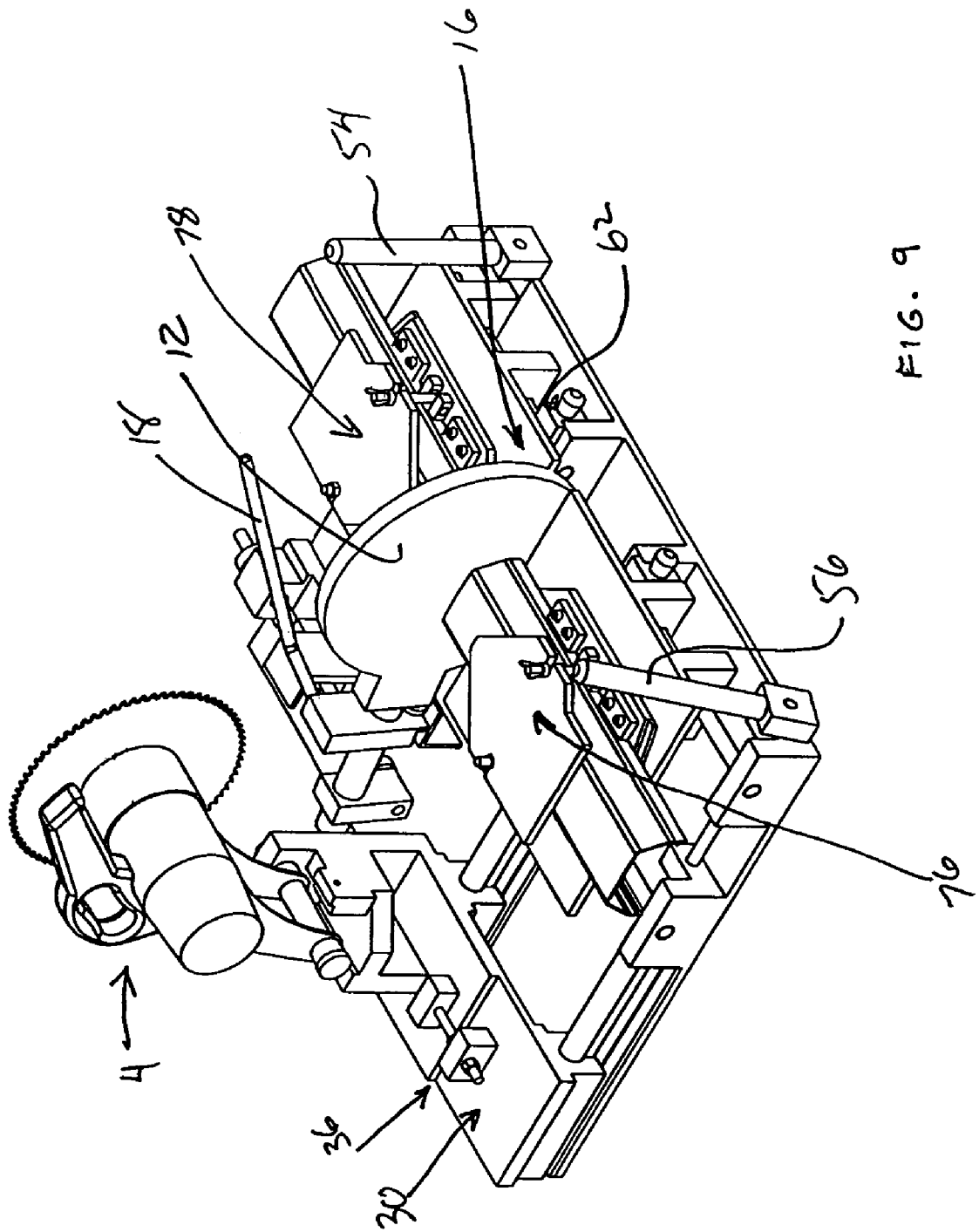
FIG. 9 is a front perspective view of the apparatus with two lengths of eavestrough in thermal contact with a thermal heating plate.

FIG. 9 shows the thermal plate 12 forced against the eavestrough section on the left table. Note that the right table is not in contact with the support block 62.

Once the eavestrough sections have been appropriately heated, and this can be based on a time, pressure or operator expertise, the pressure is removed and the right eavestrough section or left eavestrough section can be moved to a release position of the thermal plate. The thermal plate 12 is then moved upwardly and to the right to its storage position. Preferably the right sliding table would have been moved to allow the thermal plate 12 to be moved to its storage position. At this point, it is possible to move the right table into abutting contact with the eavestrough section of the left table which has been held in the desired indexed position. This is a pressure contact and there can be a small amount of beading or protrusion on the exterior and the interior of the eavestrough section as shown in FIGS. 10 and 11. If desired, after the thermal weld has been completed, the bead on the exterior can be tapered or removed with a small hand tool. In most cases this is not necessary.

Time is an important parameter in the heating process and a visual indication or audible signal could be provided for a particular cycle. For example, a timer could automatically start based on a certain pressure being generated urging the eavestroughs into contact with the thermal plate. A cycle period could automatically count down and provide an audible sound at the end thereof. This cycle period could be predetermined or manually adjustable by the user. This could assist the operator in achieving consistent thermal joins. As can be appreciated, time, pressure and temperature are all important factors in heating the eavestrough ends for joining, as well as the joining step.

The joined eavestrough sections 200 and 202 of FIG. 10 have been fused at a 45 degree angle as would be required for many eavestrough corner joints. The thermal weld produced at the corner is of high structural integrity and is not prone to leakage. Thus the apparatus allows for not only joining of eavestrough sections in an end to end manner to form a continuous length of eavestrough, it also allows a thermal joining of eavestrough sections at different angles. The eavestrough sections 200 and 202 are shown in FIG. 11 showing the interior of the eavestrough. It can be seen that there is a small protrusion bulge 204 on the interior surface. As this protrusion or regional thickening is on the interior surface, it does not affect the visual appeal of the product.

The drawings show a contemporary style eavestrough section, however, the apparatus works with any open top eavestrough sections used with plastic eavestrough. The cutting and joining apparatus simplifies the formation of corner joints and end to end joining of eavestrough sections. Although the 90 degree connection is shown, it is often necessary to use a 120 degree connection where rather than a 45 degree cut, a 30 degree cut position is used. This type of angle is often associated with bow or bay windows.

Although not specifically shown, it is possible to have various predetermined index locations for the pivoting eavestrough supports on the sliding tables.

With the present invention, the power saw and the thermal plate are preferably controlled for movement into the cutting and welding gap 9 and maintained perpendicular to the sliding tables. The sliding tables control the position of the eavestrough as well as the angle of the eavestrough during cutting and subsequent joining. As can be appreciated, the cutting and joining apparatus is small and compact and easily controlled by an operator at the job site. The particular apparatus as shown for illustration purposes, has not included any shields for the saw or thermal plate. Such safety shields would be provided for the commercial unit.

In the present design, both the saw and thermal plate are provided above the base of the apparatus. It is possible to mount the thermal plate below the welding and cutting gap 9 and have it move into the gap from below. This increases the height of the device but it is a practical alternative.

The power control circuit also includes an arrangement for automatically cutting off the power to the thermal plate 12 when the saw 4 is activated. Thus the thermal plate can be supplied with power on an ongoing basis to maintain a desired temperature. When the saw 4 is activated, the power available to the thermal plate is temporarily interrupted. In this way, the device automatically interrupts power to the thermal plate when the saw is used and automatically resumes supplying power as required for heating of the thermal plate when the saw is not in use. With this arrangement, the apparatus will not exceed the current draw of the power supply. The control panel can also include a time or timing circuit to assist in controlling the joining operation.

The power controls circuit 40 includes temperature control of the thermal plate 12 to maintain it at a desired temperature. This is an adjustable control provided in the power control 40. It is often desirable to be able to adjust this temperature for the particular job conditions and/or the plastic eavestrough being joined.

Figure 12:
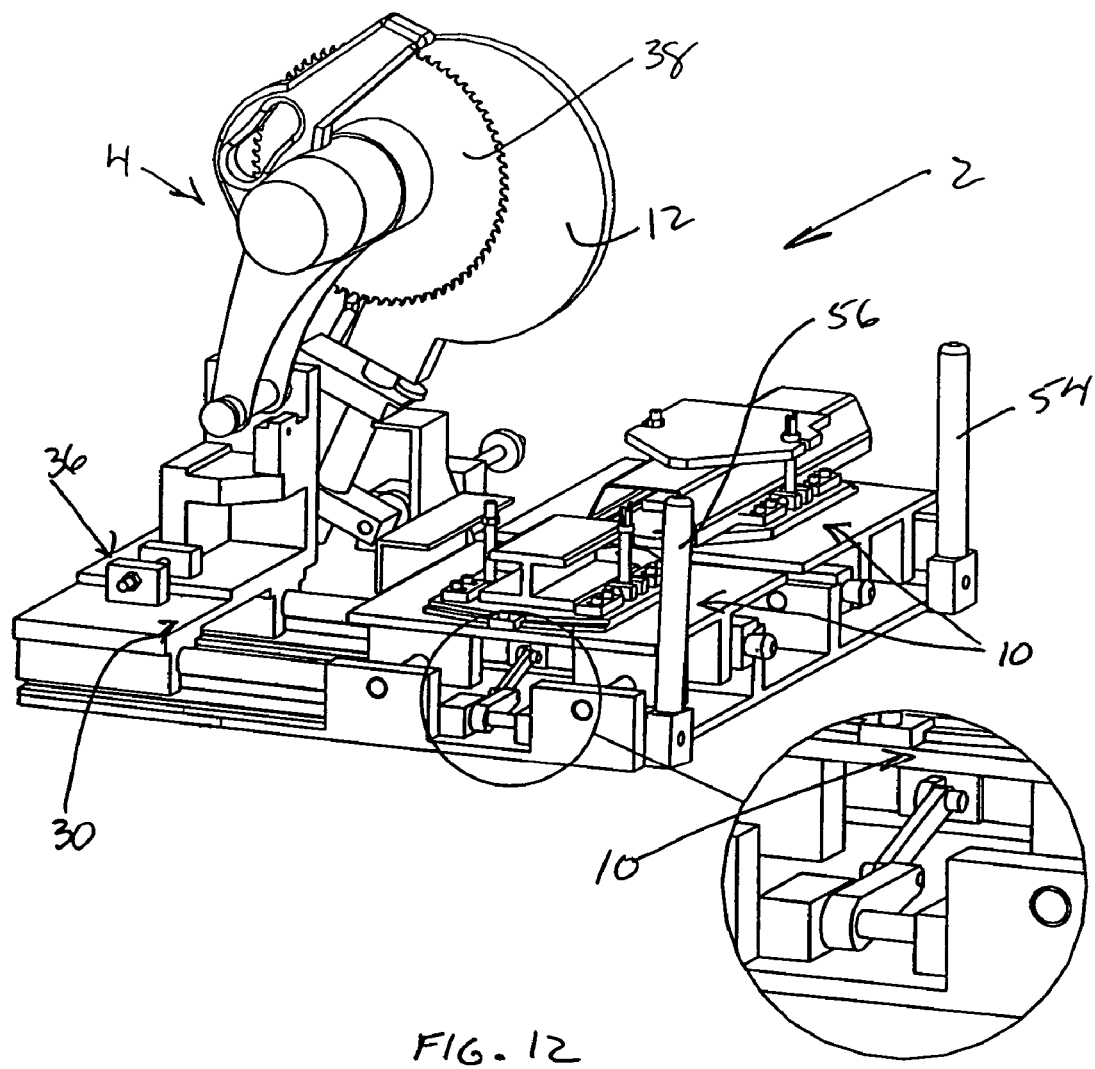
FIG. 12 is a top view of a sliding section eavestrough support block.
Figure 12A:
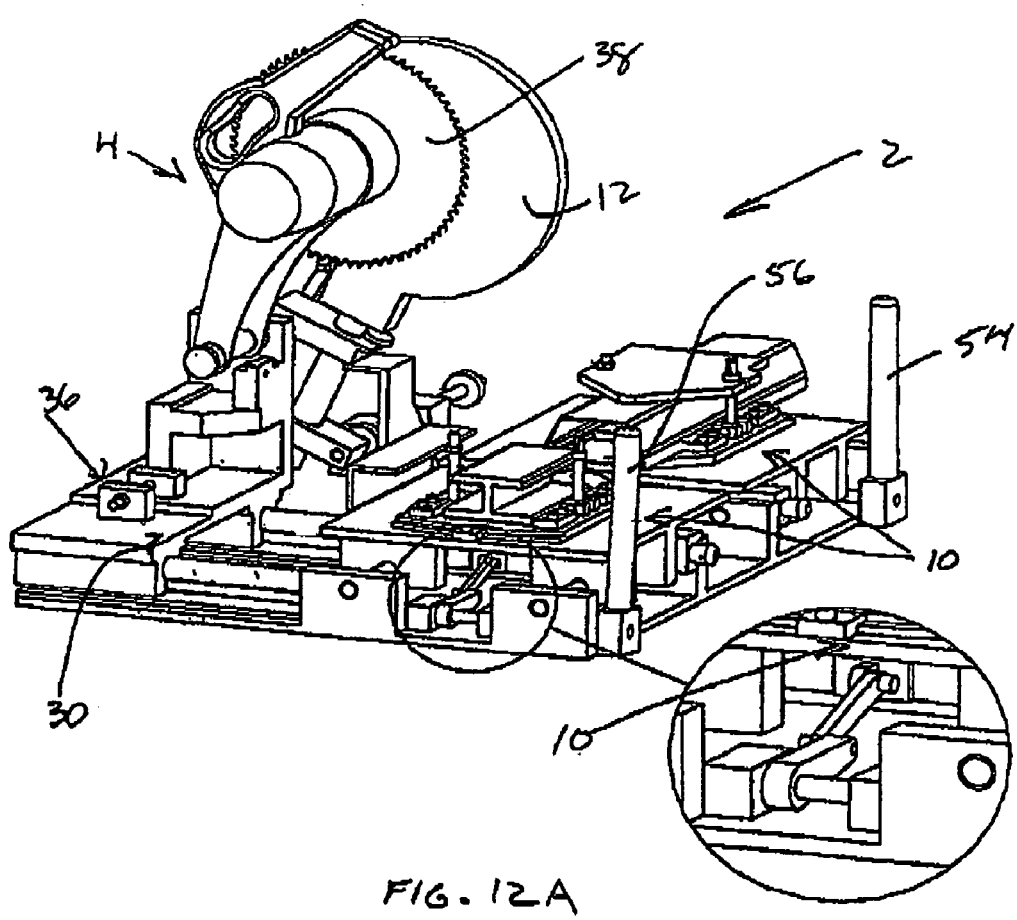
FIG. 12A is a perspective view of the apparatus.

FIG. 12 shows a K style eavestrough 300 supported on a sliding sectional support 302. This sliding sectional support 302 is removably mounted on one of the sliding tables. The support 302 receives the eavestrough in an inverted orientation and also clamps the eavestrough by the lateral blocks 304 and 306. Wing nut 308 allows clamping of the blocks 304 and 306. The sectional support block pivots about pin 310 and is movable to different positions as shown in FIGS. 14 and 15. These positions are end positions but any position therebetween can be set. With the sliding sectional support 302, the eavestrough section is supported adjacent the cut line and adjacent the thermal joint. Tightening of the wing nuts prevents inadvertent movement of the sliding block 302 and thus holds it in a desired position. Also the eavestrough section remains clamped and thus maintains its orientation after cutting in preparation for the thermal joining steps. Automatic sliding is accomplished through the curved slide tracks.

With the onsite thermally joined plastic eavestrough system as described herein, the possibility of leakage is substantially reduced. In previous eavestrough corner junctions, two mechanical join lines and thus two possible leak positions occurred. For example, in an aluminum system, a 90 degree corner used a 90 degree connector for forming the corner portion. Each length of eavestrough was mechanically secured to the 90 degree connector and thus, two positions of possible leakage occur. This same analysis applies for plastic systems that use corner connectors. With the present system, as the eavestroughs are thermally joined to each other, there is only one possible leak position and the likelihood of leakage is low, due to the integral connection.

Although various preferred embodiments of the present invention have been described herein in detail, it will be appreciated by those skilled in the art that variations may be made thereto without departing from the spirit of the invention or the scope of the appended claims.

The embodiments of the invention in which an exclusive property or privilege is claimed are defined as follows:

1. An apparatus for cutting and joining plastic eavestrough in a thermal weld type connection comprising a power saw pivotally mounted and movable between a storage position and a cutting position, two opposed eavestrough supports, one on either side of said cutting position, a thermal plate temperature controlled for facilitating the joining and pivotally movable between a storage position and an eavestrough heating position adjacent said cutting position, and means for moving said eavestrough supports relative to one another in a lateral direction with respect to said predetermined cutting position.

2. An apparatus for cutting and joining plastic eavestrough as claimed in claim 1 wherein said two opposed eavestrough supports are two tables with each table having a removable eavestrough support block mounted thereon.

3. An apparatus for cutting and joining plastic eavestrough as claimed in claim 2 wherein said eavestrough support blocks are shaped to receive an eavestrough section having a generally U-shaped cross section in an inverted orientation such that the U is inverted.

4. An apparatus for cutting and joining plastic eavestrough as claimed in claim 2 wherein said two tables are each laterally movable towards and away from said cutting position.

5. An apparatus for cutting and joining plastic eavestrough as claimed in claim 4 wherein said power saw is mounted for sliding movement in a direction perpendicular to the lateral movement of said two tables.

6. An apparatus for cutting and joining plastic eavestrough as claimed in claim 2 including a clamp arrangement for each of said eavestrough support blocks.

7. An apparatus for cutting and joining plastic eavestrough as claimed in claim 2 wherein said tables have a eavestrough cut stop position, and an eavestrough thermal heating stop position for controlling the lateral movement of said tables.

8. An apparatus for cutting and joining plastic eavestrough as claimed in claim 2 wherein said tables are pivotal for movement to angled positions for forming different angled corner connections of eavestroughs.

9. An apparatus for cutting and joining plastic eavestrough as claimed in claim 8 wherein each table has an angle gauge for setting a desired corner angle configuration.

10. An apparatus for cutting and joining plastic eavestrough as claimed in claim 2 wherein said tables are adjustable to vary a contact pressure between eavestroughs being joined.

11. An apparatus for cutting and joining plastic eavestrough as claimed in claim 2 wherein said tables include a manual pivoting lever for controlling the position thereof.

12. An apparatus for cutting and joining plastic eavestrough as claimed in claim 1 wherein said thermal plate in said eavestrough heating position and said saw in said cutting position are each aligned with a common working plane between said eavestrough supports.

13. An apparatus for cutting and joining plastic eavestrough as claimed in claim 1 including a power control module for controlling a power supply between said power saw and said thermal plate, said power control module interrupting power to said thermal plate when said power saw is activated.

14. An apparatus for cutting and joining plastic eavestrough as claimed in claim 13 wherein said power supply is a 120 volt supply.

15. An apparatus for cutting and joining plastic eavestrough as claimed in claim 1 wherein said apparatus is portable.

* * * * *